United States Patent
Kurosawa

[11] Patent Number: 6,154,536
[45] Date of Patent: Nov. 28, 2000

[54] ORDER WIRE ACCOMMODATION SYSTEM FOR INTEROFFICE COMMUNICATIONS

[75] Inventor: Katsuhiko Kurosawa, Tokyo, Japan

[73] Assignee: NEC Corporation, Tokyo, Japan

[21] Appl. No.: 09/078,239

[22] Filed: May 13, 1998

[30] Foreign Application Priority Data

May 15, 1997 [JP] Japan .................................. 9-124618

[51] Int. Cl.⁷ .................................................. H04M 7/00
[52] U.S. Cl. ........................ 379/333; 379/345; 379/325; 379/326
[58] Field of Search .................................... 379/333, 313, 379/315, 319, 320, 321, 325, 326, 334, 335, 345, 348, 389; 370/235, 282

[56] References Cited

U.S. PATENT DOCUMENTS

| | | | |
|---|---|---|---|
| 3,818,151 | 6/1974 | Chambers, Jr. et al. ............... | 379/347 |
| 3,919,502 | 11/1975 | Daryanani ................................ | 379/403 |
| 4,328,579 | 5/1982 | Hashimoto et al. ..................... | 370/210 |
| 5,295,186 | 3/1994 | Okamoto .................................. | 379/402 |
| 5,712,846 | 1/1998 | Yoshimura ............................... | 370/226 |

FOREIGN PATENT DOCUMENTS

| | | |
|---|---|---|
| 2-164166 | 6/1990 | Japan . |
| 402198257 | 8/1990 | Japan . |
| 403214937 | 9/1991 | Japan . |
| 404014339 | 1/1992 | Japan . |
| 404023642 | 1/1992 | Japan . |
| 404291543 | 10/1992 | Japan . |
| 5-153238 | 6/1993 | Japan . |
| 405244181 | 9/1993 | Japan . |
| 407202922 | 8/1995 | Japan . |
| 407303149 | 11/1995 | Japan . |
| 363114434 | 5/1998 | Japan . |

OTHER PUBLICATIONS

Office Action Issued by the Japanese Patent Office in the Corresponding Japanese Application on Feb. 9, 1999 and an English Translation thereof.

*Primary Examiner*—Krista Zele
*Assistant Examiner*—Benny Q. Tieu
*Attorney, Agent, or Firm*—Ostrolenk, Faber, Gerb & Soffen, LLP

[57] ABSTRACT

An order wire accommodation system comprises four interface boxes each of which has the same order wire interface section as the others. The order wire interface section has a circuit which digitally adds order wire signals of the transmission lines from two ports and the order wire signals which interface with the other interface boxes or a telephone through the other two ports. Each output from the order wire interface section is a sum of all the order wire signals inputted except for those of the order wire interface section itself. Because of a provision of two ports which interface externally, the interface boxes can be cascaded connected to one another, by which order wire communications among all the transmission lines accommodated in the interface boxes become possible. Further, the order wire accommodation system can be minimized and be simplified.

4 Claims, 2 Drawing Sheets

ORDER WIRE ACCOMMODATION SYSTEM FOR INTEROFFICE COMMUNICATIONS

BACKGROUND OF THE INVENTION

The present invention relates to a method of accommodating order wires which are used for interoffice voice communications for maintenance with respect to a communication device.

DESCRIPTION OF THE RELATED ART

Typically, an order wire accommodation system would be configured in a manner shown in FIG. 1. As it is clear from FIG. 1, a conventional order wire accommodation system would take a form in which a transmission line interface unit is divided into a plurality of interface boxes. In this prior art example, interface boxes 21, 22, 23 and 24 include two transmission line interface sections 5 and a single order wire interface section 17, respectively. The order wire interface section 17 is provided as a means for substantiating order wire communications from the transmission lines 6. The interface boxes 21, 22, 23 and 24 all of which have the same structure are connected to an external order wire accommodation device 9 through order wire lines 18. The external order wire accommodation device 9 is provided with a telephone interface serving as a connection to a telephone 11.

This type of order wire accommodation system would operate in the manner which will be described in the following.

The transmission line interface sections 5 are connected to a communication device of another office (not shown) through transmission lines 6. In a process of order wire communication with the other office which is connected with interface boxes 21~24, order wire digital signals inputted from the transmission lines 6 to the transmission line interface sections 5 of each interface box are added together at the order wire interface section 17. Then all the order wire signals being added at interface boxes 21, 22, 23 and 24 are to be added together at the order wire accommodation device 9. With the accomplishment of the above operation, the order wire signals from all the transmission lines are added, by which order wire communications with the other office (not shown) is made possible through the telephone 11.

As to another prior art example relating to an order wire communication system, there is proposed a multi-connection method for order wire lines in Japanese Patent Laid-Open Publication No. 5-153238. In this particular example, each radio base station is provided with an order wire line connection means, by which one order wire line is divided into a number of lines, e.g. two lines, which directly connect the radio base station with an exchange office and a maintenance office. Owing to such configuration, the radio base station is capable of communicating with the exchange office and the maintenance office at the same time through a maintenance telephone.

However, in the above examples of order wire systems, there are certain problems being recognized. The order wire accommodation system described in the first prior art example have two problems to be considered. One is that a capacitance of the external order wire accommodation device increases as the number of order wires to be accommodated increases. The other has to do with a dependency on the external order wire accommodation device, which accommodates the order wires single-handedly.

As to the second prior art example, which is about the mullti-connection method for order wire lines, the main focus is on the possibility of multiplex and simultaneous communications among the radio base station, the exchange office and the maintenance office. Besides, the connection condition between the radio base station and the maintenance office is practically the same as the previous example, which suggests that the problems noted in the first example are not being resolved in this example.

SUMMARY OF THE INVENTION

It is therefore an object of the present invention to overcome the above disadvantages and provide a simplified order wire accommodation system of a smaller scale.

According to one aspect of the present invention, there is provided a minimized and simplified order wire accommodation system including at least two interface boxes. Each interface box comprises two transmission line interface sections for interfacing with transmission lines, and a single order wire interface section having interfaces including two first ports for order wire signals from the transmission lines and two second ports for order wire signals to be interfacing with an external order wire line. The two first ports are connected to the transmission lines which are connected to a communication device of another office. On the other hand, the two second ports are cascade connected to the second ports of the neighboring interface boxes through the order wire lines. One of the two second ports of one interface box serving as a connection end of a cascade connection among a plurality of interface boxes is connected to a telephone through a telephone interface line.

With respect to the above aspect of the present invention, it is preferable that the order wire interface section adds the order wire signals of the two first ports and the order wire signals of either one of the two second ports. It is also preferable that the added order wire signals of the two first ports and one of the two second ports are outputted from the other one of the two second ports.

Further, in connection with the above aspect of the present invention, it is preferable that the cascade connection among the interface boxes are that one of the two second ports of each interface box is connected to the closer one of the two second ports of a neighboring interface box.

The above and further objects and the novel feature of the invention will more fully appear from the following detailed description when the same is read in connection with the accompanying drawings. It is to be expressly understood, however, that the drawings are for illustration only and are not intended as a definition of the limits of the invention.

DESCRIPTION OF THE PREFERRED EMBODIMENTS

Figure 1:
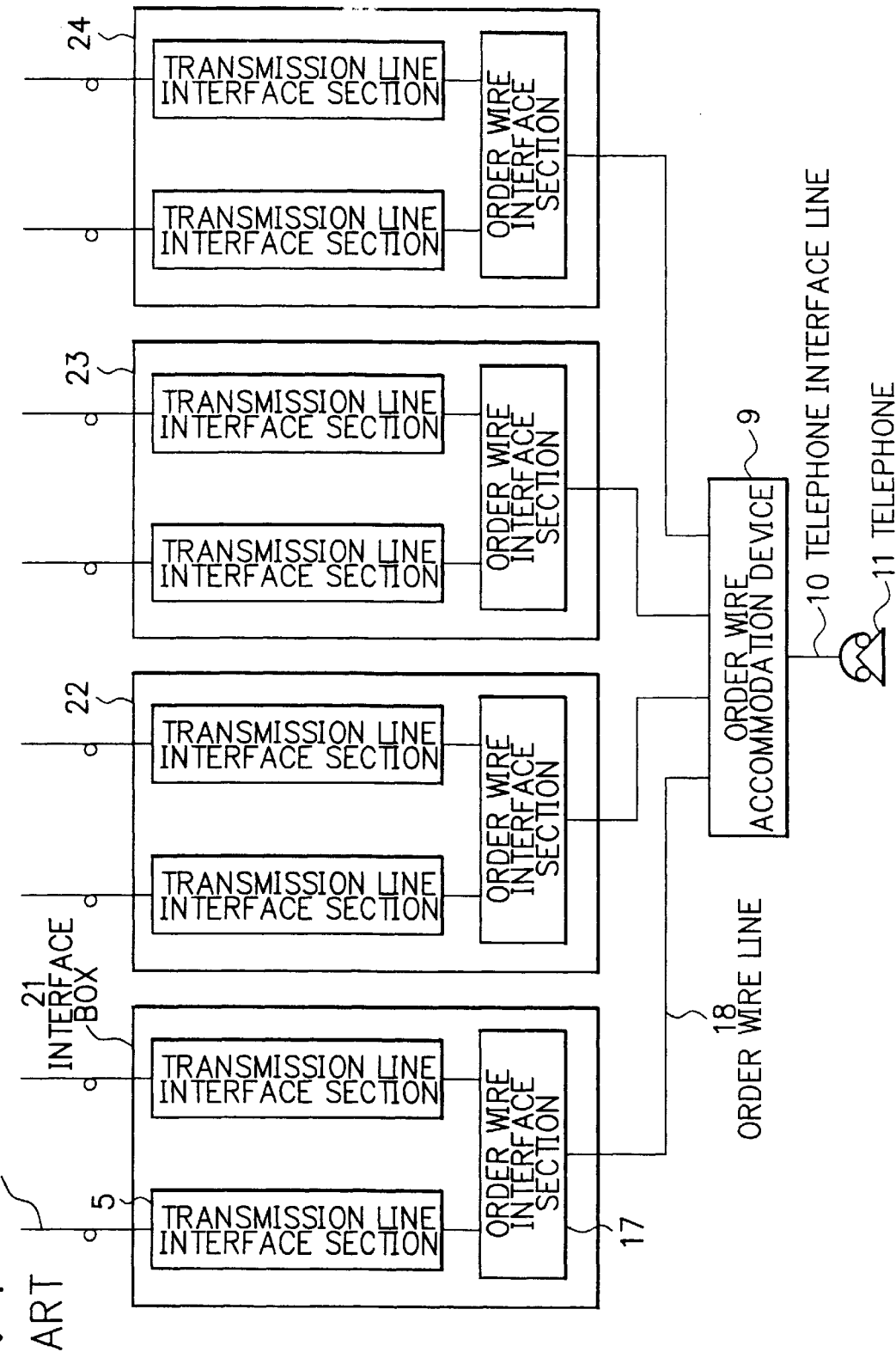
FIG. 1 is a block diagram showing an order wire accommodation system of a first prior art example.

Referring now to the drawings, a description of preferred embodiments of an order wire accommodation system of the present invention will be given in detail.

Figure 2:
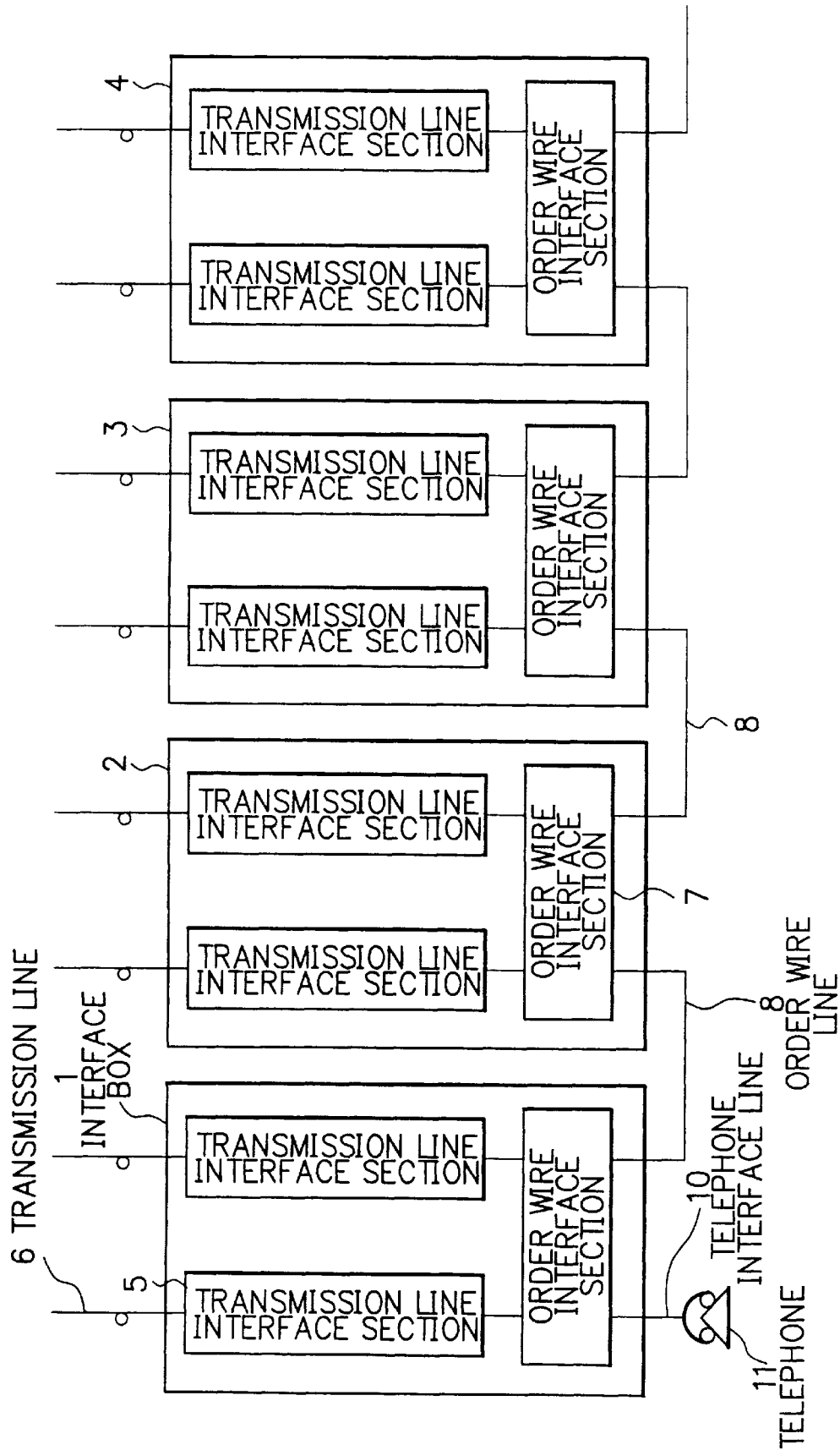
FIG. 2 is a block diagram showing an embodiment of an order wire accommodation system of the present invention.

FIG. 2 is a block diagram showing one embodiment of the order wire accommodation system of the present invention.

In other words, what is illustrated in this figure is a connection condition within a communication device applying the order wire accommodation system of the present invention.

With reference to the connection condition of the communication device applying the order wire accommodation system of the present invention as shown in FIG. 1, interface boxes 1, 2, 3 and 4 include two transmission interface sections 5 and a single order wire interface section 7, respectively. The order wire interface section 7 includes order wire interfaces which are two ports (P1, P2) connected to transmission lines 6 for order wire communications, and another two ports (P3, P4) interfacing with an external order wire line 8 for transmitting order wire signals.

As to interface boxes 1, 2, 3 and 4 all of which have the same structure, the first set of ports (P1, P2) of each interface box are connected to a communication device of another office (not shown) through transmission lines 6, and the second set of ports (P3, P4) are cascade connected to ports (P4, P3) of the neighboring interface boxes through the order wire lines 8. One end of the whole cascade connection is connected to a telephone 11 through a telephone interface line 10.

The second set of input/output ports (P3, P4) having a telephone interface are cascade connected to one another among the interface boxes 1, 2, 3 and 4. In this cascade connection, one of the two ports (P4 or P3) of the preceding interface box is to connect with one of the two ports (P3 or P4) of the following interface box. Thus, all interface boxes are interfacing with other interface boxes through the order wire lines 8, except for interface box 1 which has one port (P3) serving as an end to the whole cascade connection and connected to the telephone 11 through the telephone interface line 10. The other port (P4) of interface box 1 is connected to a port (P3) of the interface box 2 via the order wire line 8.

In such a case where the transmission line interface unit comprises a plurality of interface boxes as illustrated in FIG. 1, each interface box includes the same order wire interface section 7 as the others. The order wire interface section 7 comprises a circuit for digitally adding the order wire signals from the transmission lines 6 with the order wire signals to be interfacing with the other interface boxes or the telephone. Each output from the order wire interface section 7 is a sum of all the inputted order wire signals except for the ones of the order wire interface section 7 itself.

By connecting the ports of the interface boxes 1, 2, 3 and 4, it is possible to indirectly connect the order wires among the interface boxes accommodating the transmission lines. Further, for each section has two external ports connected to the transmission lines 6, by having the interface boxes cascade connected, order wire communications between the telephone 11 and the other office connected through the accommodated transmission lines 6 become possible. Therefore, according to the present embodiment, there is no need for external order wire accommodation device as in the conventional case, and thus each of a plurality of order wire interfaces being applied can become minimized, common and less expensive.

As described in the forgoing, the order wire accommodation system of the present invention has at least two interface boxes each of which includes two transmission line interface sections 5 and a single order wire interface section 7. Each interface box is connected to two transmission lines 6 which link the box to the device of the other office through ports P1 and P2 of the order wire interface section 7. The other two ports P3 and P4 are cascade connected to the neighboring interface boxes through the order wire lines 8, thus forming a cascade connection among two or more interface boxes. One end of the cascade connection is connected to the telephone 11 through a telephone interface 10.

In accordance with such structure, the necessity of external order wire accommodation device is eliminated. Further, by cascade connecting the order wire signals among the interface boxes, order wire communications among all the transmission lines accommodated in the interface boxes become possible, which means that the order wire accommodation system can be minimized and simplified.

While a preferred embodiment of the invention has been described using specific terms, such description is for illustrative purposes only, and it is to be understood that changes and variations may be made without departing from the spirit or the scope of the following claims.

What is claimed is:

1. A minimized and simplified order wire accommodation system including at least two interface boxes, each interface box comprising:

two transmission line interface sections for interfacing with transmission lines; and a single order wire interface section having interfaces including two first ports for order wire signals from the transmission lines and two second ports for order wire signals to be interfacing with an external order wire line, the two first ports being connected to the transmission lines which are connected to a communication device of another office, the two second ports being cascade connected to the second ports of the neighboring interface boxes through the order wire lines, and one of the two second ports of one order wire interface section serving as a connection end of a cascade connection among a plurality of interface boxes being connected to a telephone through a telephone interface line.

2. An order wire accommodation system according to claim 1, wherein:

the order wire interface section adds the order wire signals of the two first ports and the order wire signals of either one of the two second ports.

3. An order wire accommodation system according to claim 2, wherein:

the added order wire signals of the two first ports and one of the two second ports are outputted from the other one of the two second ports.

4. An order wire accommodation system according to claim 3, wherein:

one of the two second ports of each one of two or more interface boxs is connected to the closer one of the two second ports of a neighboring interface box, thus forming a cascade connection among the interface boxes.

* * * * *